(12) United States Patent
Annau et al.

(10) Patent No.: US 8,255,386 B1
(45) Date of Patent: Aug. 28, 2012

(54) SELECTION OF DOCUMENTS TO PLACE IN SEARCH INDEX

(75) Inventors: Thomas M. Annau, San Carlos, CA (US); Charles Garrett, Woodinville, WA (US); Sharmila Subramaniam, Mountain View, CA (US); Sanjay Joshi, Mountain View, CA (US); Rosemary Emery-Montemerlo, Palo Alto, CA (US); Aaron A. D'Souza, Mountain View, CA (US); Jonathan D. Wilson, Cupertino, CA (US); Christopher W. Fraser, Seattle, WA (US)

(73) Assignee: Google Inc., Mountain View, CA (US)

( * ) Notice: Subject to any disclaimer, the term of this patent is extended or adjusted under 35 U.S.C. 154(b) by 311 days.

(21) Appl. No.: 12/022,187

(22) Filed: Jan. 30, 2008

(51) Int. Cl.
*G06F 17/30* (2006.01)

(52) U.S. Cl. ....................................................... 707/711
(58) Field of Classification Search .................... 707/711
See application file for complete search history.

(56) References Cited

U.S. PATENT DOCUMENTS

| | | | |
|---|---|---|---|
| 5,920,854 A * | 7/1999 | Kirsch et al. ........................... 1/1 |
| 2004/0117367 A1* | 6/2004 | Smith et al. ......................... 707/5 |
| 2004/0186827 A1* | 9/2004 | Anick et al. ....................... 707/3 |
| 2005/0071465 A1* | 3/2005 | Zeng et al. ...................... 709/224 |
| 2006/0287993 A1* | 12/2006 | Yao et al. ........................... 707/4 |

* cited by examiner

*Primary Examiner* — Yuk Ting Choi
(74) *Attorney, Agent, or Firm* — Harrity & Harrity, LLP

(57) ABSTRACT

A system may identify a collection of documents, predict a utility score for each document in the collection of documents, and create a ranked list of the documents based on the predicted utility scores for the documents. The system may also select a number of the documents in the ranked list of documents, index the selected documents, and store the index.

30 Claims, 9 Drawing Sheets

SELECTION OF DOCUMENTS TO PLACE IN SEARCH INDEX

BACKGROUND

The World Wide Web ("web") contains a vast amount of information that is ever-changing. Existing web-based information retrieval systems use web crawlers to identify information on the web. For example, a web crawler may receive feeds of documents from webmasters.

A web crawler may also exploit the link-based structure of the web to browse the web in a methodical, automated manner. A web crawler may start with addresses (e.g., Uniform Resource Locators (URLs)) of links to visit. For each address on the list, the web crawler may visit the document associated with the address. The web crawler may identify outgoing links within the visited document and add addresses associated with these links to the list of addresses.

An indexer creates an index of the documents identified by the web crawler. A problem that indexers face is how to select documents to place in the index. The amount of space in the index is limited. Also, some documents might not be worth the cost (monetary and/or time) of indexing and serving. Therefore, only a subset of the documents identified by the web crawler get placed in the index.

SUMMARY

According to one aspect, a method may include identifying a collection of documents; predicting a utility score for each document in the collection of documents; creating a ranked list of the documents based on the predicted utility scores for the documents; selecting a number of the documents in the ranked list of documents; indexing the selected documents to create an index; and storing the index.

According to another aspect, a system, which may be implemented within one or more computer devices, may include means for generating rules for a model based on a number of search queries previously submitted by users, search results that were provided to the users, and information regarding the users' interest in certain ones of the search results. The system may also include means for identifying a collection of documents, means for predicting a measure of quality of each document in the collection of documents as a search result for users' search queries based on the model, and means for creating a ranked list of the documents based on the predicted measures of quality of the documents. The system may also include means for selecting a number of the documents in the ranked list of documents, means for indexing the selected documents to create an index, and means for storing the index.

According to yet another aspect, a system, which may be implemented within one or more computer devices, may include one or more memories connected to one or more processors. The one or more processors may identify a collection of documents, predict a measure of quality of each document in the collection of documents as a search result for users' search queries, and create a ranked list of the documents based on the predicted measures of quality for the documents. The one or more processors may also select a number of the documents in the ranked list of documents, index the selected documents to create an index, and store the index in the one or more memories.

According to a further aspect, a method may include identifying a set of documents that were previously included in an index; determining, for each of the documents, a utility score that reflects a measure of quality of the document as a search result for users' search queries; determining a set of document features associated with each of the documents; generating, based on the sets of document features and the utility scores, model rules for a model that maps the sets of document features to the utility scores; and storing the model.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Overview

In the description to follow, reference will be made to "documents." A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a business listing, an electronic version of printed text, a web advertisement, an image, a database record, etc. In the context of the Internet, a common document is a web page. Web pages often include textual information and may include embedded information (such as meta information, images, links, etc.) and/or embedded instructions (such as Javascript, etc.).

Figure 1:
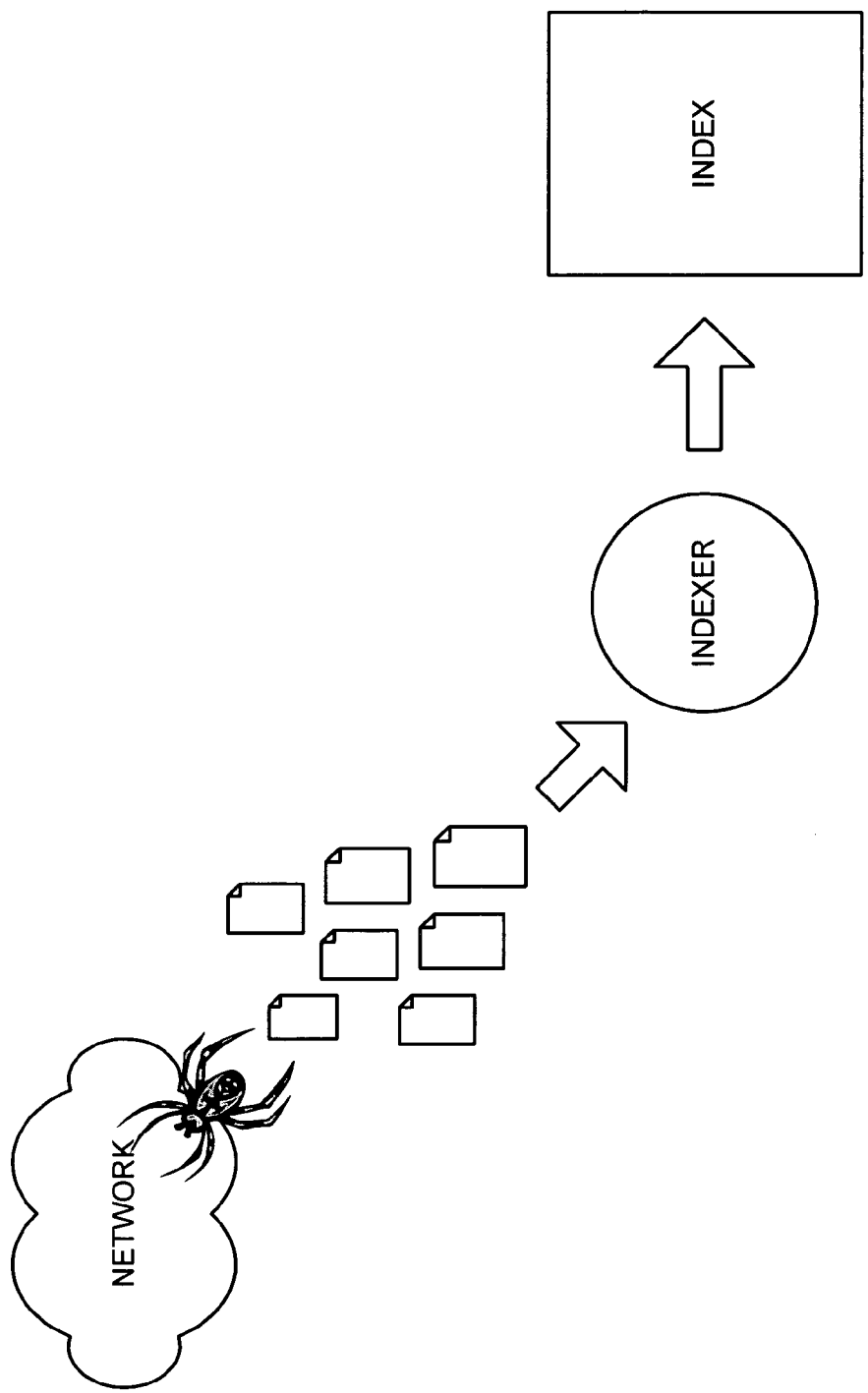
FIG. 1 is a diagram of an overview of an exemplary implementation described herein.

FIG. 1 is a diagram of an overview of an exemplary implementation described herein. As shown in FIG. 1, a network of documents may be identified by a crawler (often referred to as a "spider"). The identified documents may be fed to an indexer. The indexer may select documents to include in an index. There may be different indices for different types of documents. An "index," as used herein may include a single index or a main index of a group of indices. Each of one or more indexers may create one or more indices, where a search query may choose documents from one or more of the indices. Each of these indices may be tiered with, for example, a top tier index and one or more lower tier indices. Documents from the top tier index may be served on every search and documents from the lower tier index/indices may be served only for certain searches. Also, the top tier index may be refreshed more often than the lower tier index/indices.

Because the devices serving the index may have a limited amount of storage space, not all of the documents can be placed in the index. Additionally, it may be desirable, for certain reasons, to exclude certain documents from the index. Therefore, the indexer must decide which documents to include in the index and which documents to exclude. It would be beneficial for the index to include documents that would likely satisfy users' search queries. In implementations described herein, the indexer may predict the probability that documents will satisfy users' search queries and include certain ones of these documents in the index based on their predicted probability that the documents will satisfy users' search queries.

Exemplary Network Configuration

Figure 2:
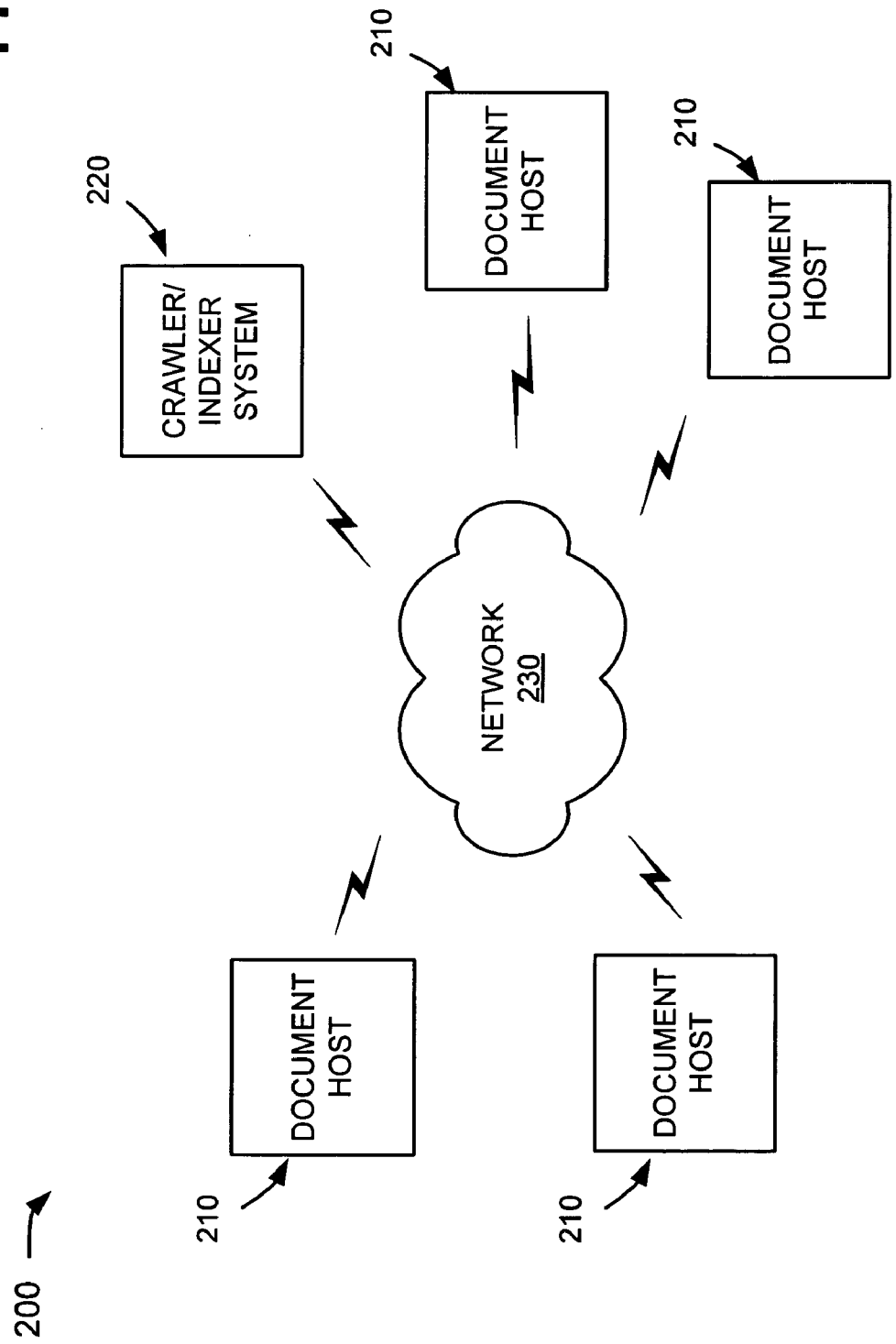
FIG. 2 is a diagram of an exemplary network in which systems and methods described herein may be implemented.

FIG. 2 is a diagram of an exemplary network 200 in which systems and methods described herein may be implemented. Network 200 may include multiple document hosts 210 connected to a crawler/indexer system 220 via a network 230. Four document hosts 210 and a single crawler/indexer system 220 have been illustrated as connected to network 230 for simplicity. In practice, there may be more, fewer, or a different arrangement of document hosts 210 and/or crawler/indexer systems 220.

Document hosts 210 may include entities that store and/or manage documents. An "entity" may be defined as a device, such as a stationary or portable computer, a personal digital assistant (PDA), a telephone device, or another type of computation or communication device, a thread or process running on one of these devices, and/or an object executable by one of these devices.

Crawler/indexer system 220 may include an entity that crawls, processes, indexes, and/or maintains documents. For example, crawler/indexer system 220 may crawl a corpus of documents (e.g., web documents), index the documents, and/or store information associated with the documents in a repository of documents. While crawler/indexer system 220 is shown as a single entity, it may be possible for crawler/indexer system 220 to be implemented as two or more separate (and possibly distributed) entities.

Network 230 may include a local area network (LAN), a wide area network (WAN), a telephone network, such as the Public Switched Telephone Network (PSTN) or a cellular network, an intranet, the Internet, or a combination of networks. Document hosts 210 and crawler/indexer system 220 may connect to network 230 via wired and/or wireless connections. The connections may either be direct or indirect connections.

Exemplary Crawler/Indexer System Architecture

Figure 3:
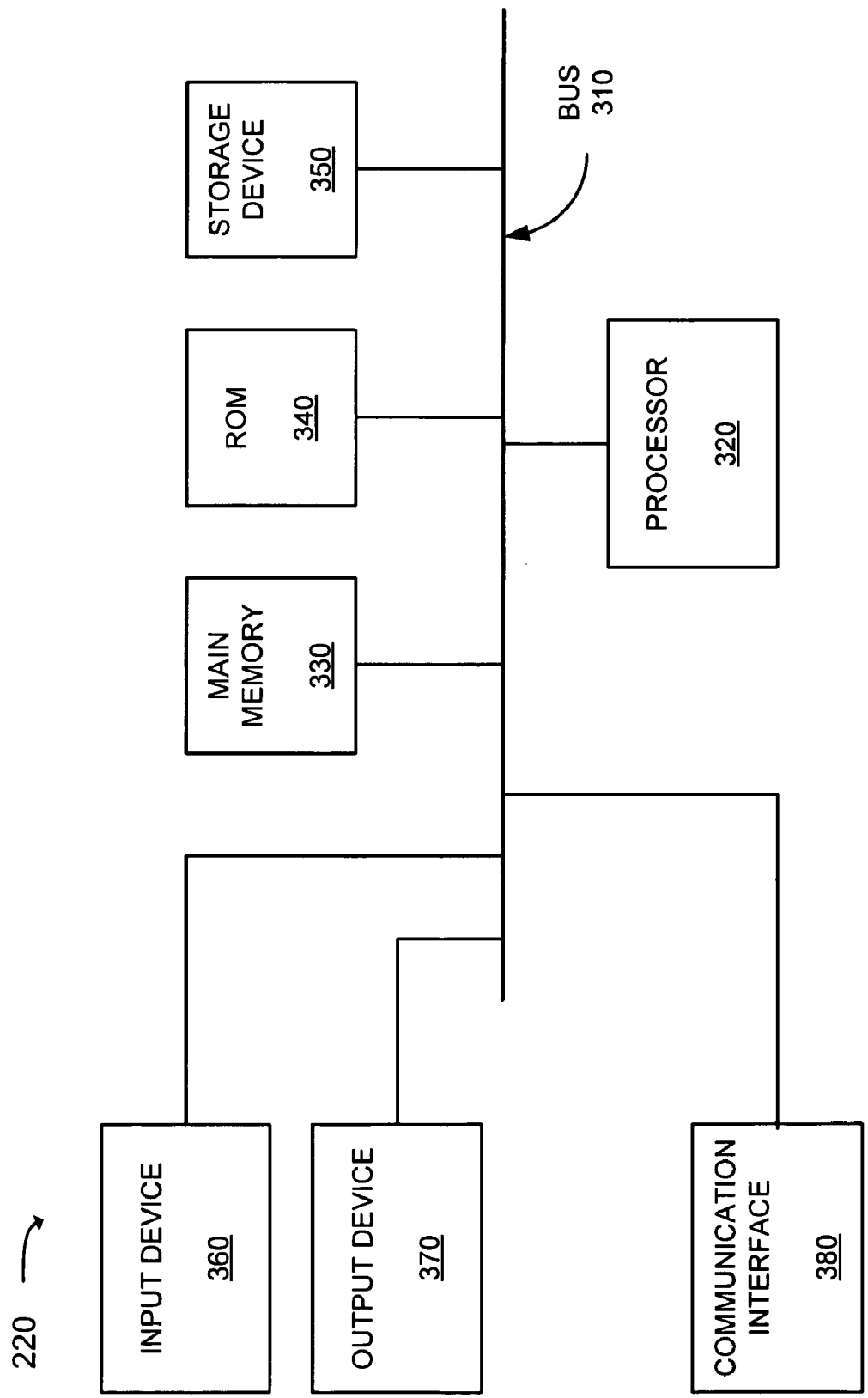
FIG. 3 is a diagram of exemplary components of the crawler/indexer system of FIG. 2.

FIG. 3 is a diagram of exemplary components of crawler/indexer system 220. Crawler/indexer system 220 may include a bus 310, a processor 320, a main memory 330, a read only memory (ROM) 340, a storage device 350, an input device 360, an output device 370, and a communication interface 380. Bus 310 may include a path that permits communication among the components of crawler/indexer system 220.

Processor 320 may include a processor, a microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a component that permits an operator to input information to crawler/indexer system 220, such as a keyboard, a mouse, a pen, voice recognition and/or biometric mechanisms, etc. Output device 370 may include a component that outputs information to the operator, including a display, a printer, a speaker, etc. Communication interface 380 may include any transceiver-like mechanism that enables crawler/indexer system 220 to communicate with other devices and/or systems. For example, communication interface 380 may include components for communicating with another device or system via a network, such as network 230.

Crawler/indexer system 220 may perform certain operations, as will be described in detail below. Crawler/indexer system 220 may perform these operations in response to processor 320 executing software instructions contained in a computer-readable medium, such as memory 330. A computer-readable medium may be defined as a physical or logical memory device.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Exemplary Crawler/Indexer System Functional Components

Figure 4:
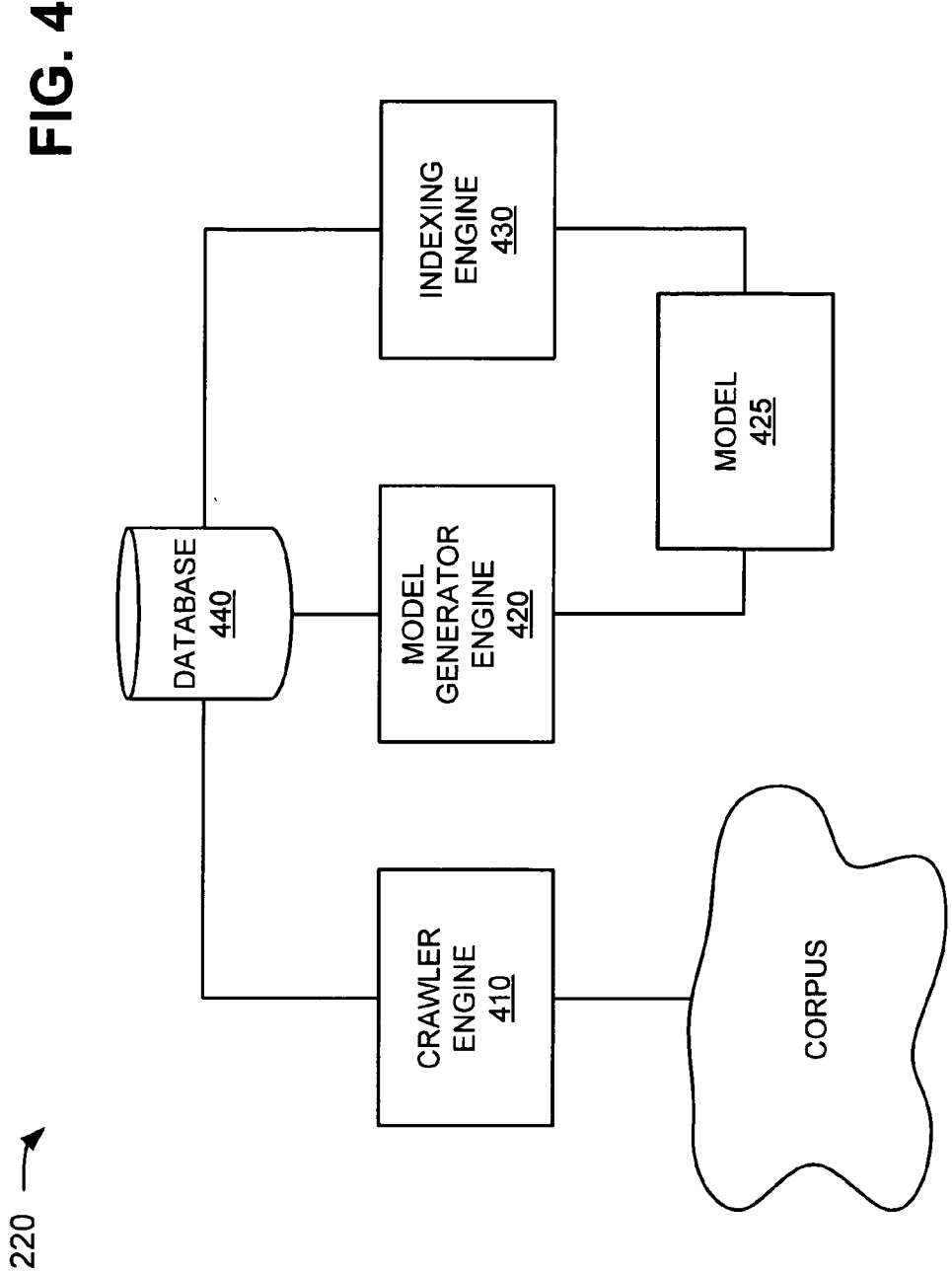
FIG. 4 is a diagram of exemplary functional components of the crawler/indexer system of FIG. 2.

FIG. 4 is a diagram of exemplary functional components of crawler/indexer system 220. Crawler/indexer system 220 may include a crawler engine 410, a model generator engine 420, and an indexing engine 430 connected to a database 440. In one implementation, crawler engine 410, model generator engine 420, and/or indexing engine 430 may be implemented by software and/or hardware within crawler/indexer system 220. In another implementation, crawler engine 410, model generator engine 420, and/or indexing engine 430 may be implemented by software and/or hardware within another device or a group of devices separate from or including crawler/indexer system 220.

Crawler engine 410 may receive feeds of documents from one or more webmasters. Alternatively, or additionally, crawler engine 410 may operate from a list of addresses to fetch the corresponding documents from a corpus of documents (e.g., the web). Crawler engine 410 may extract the addresses (e.g., URLs) associated with outgoing links in the documents and add the addresses to the list of addresses to be crawled. Crawler engine 410 may also store information associated with the documents, such as all or part of the documents, in database 440.

Model generator engine 420 may analyze historical search logs associated with documents that were previously included in an index created by indexing engine 430. Based on its analysis of the historical search logs, model generator engine 420 may build a model, such as model 425, that predicts the probability that a document will satisfy a search query if that document is included in the index.

Indexing engine 430 may operate upon documents identified by crawler engine 410 and the model built by model generator engine 420. For example, indexing engine 430 may use model 425 to predict the probability that each of the documents will satisfy a search query if that document is included in the index. Indexing engine 430 may rank the documents based on their predicted probabilities and select a number of the top-ranked documents for inclusion in the index.

Database 440 may be embodied within a single memory device or within multiple (possibly distributed) memory devices. Database 440 may receive information from and/or provide information to crawler engine 410, model generator engine 420, and/or indexing engine 430. Database 440 may also receive information from and/or provide information to other components within or external to crawler/indexer system 220 (not shown in FIG. 4).

Database 440 may store various information, such as the list of addresses used by crawler engine 410, and/or information associated with documents identified by crawler engine 410. For example, database 440 may store all or a portion of the content of the identified documents and/or features associated with the documents. Exemplary features that might be stored in database 440 for a document include: the language of the document; the encoding type associated with the document; the file type associated with the document; the host, domain, top-level domain, or organization associated with the document; a link-based score associated with the document; a length, compressed length, or a ratio of the compressed length to the original size of the document; and/or if the document was previously included in the index, information regarding how the document performed while in the index.

Database 440 may also, or alternatively, store historical search logs containing information regarding prior searches, such as search queries that were submitted, search results that were presented, and/or information that reflects users' interest in the search results. Crawler/indexer system 220 may operate in conjunction with a search engine. The search engine may provide crawler/indexer system 220 with information for the historical search logs. The information for the historical search logs may be obtained from a server operating the search engine and/or from a toolbar application (or the like) operating on a client. In one embodiment, crawler/indexer system 220 is only permitted a view of database 440 that hides individual user information.

Database 440 may also, or alternatively, store the index generated by indexing engine 430, information regarding which documents were previously included in the index, and/or a predicted probability that was determined for documents that are and/or were included in the index.

Exemplary Crawler Engine Functional Components

Figure 5:
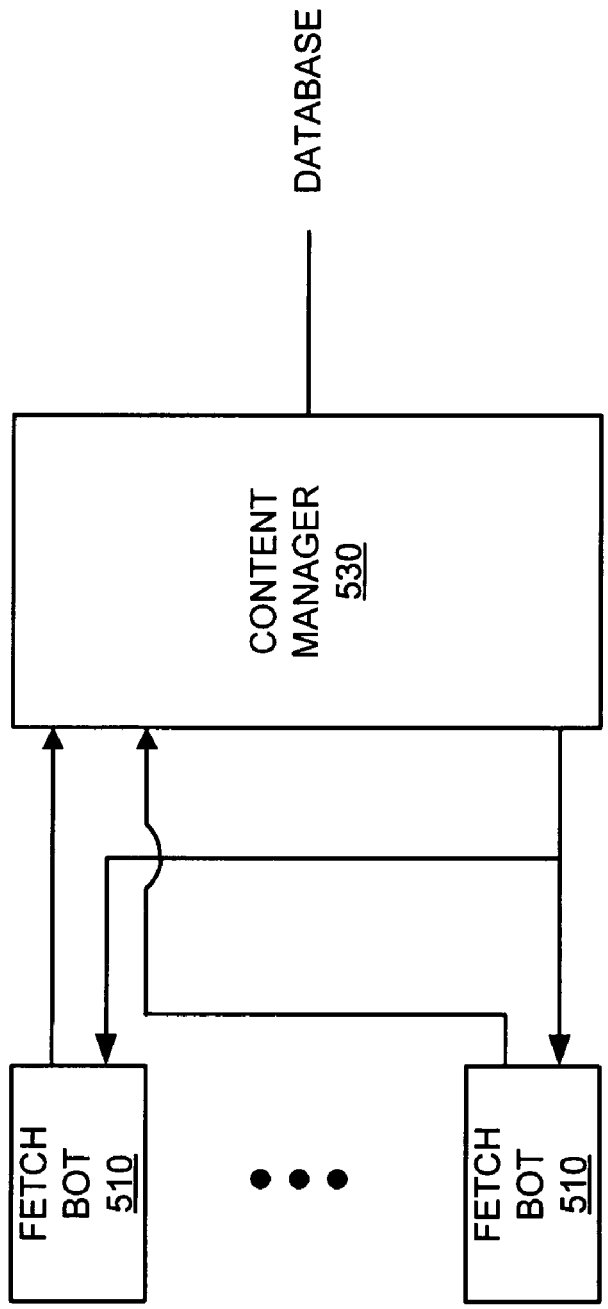
FIG. 5 is a diagram of exemplary functional components of the crawler engine of FIG. 4.

FIG. 5 is a diagram of exemplary functional components of crawler engine 410. In one implementation, crawler engine 410 may be implemented by software and/or hardware within crawler/indexer system 220. In another implementation, crawler engine 410 may be implemented by software and/or hardware within another device or a group of devices separate from or including crawler/indexer system 220.

Crawler engine 410 may include fetch bots 510 and content manager 530. A fetch bot 510 may fetch a document from a corpus of documents and provide the fetched document to content manager 530. Fetch bots 510 may operate from a list of addresses provided by content manager 530.

Content manager 530 may parse a document fetched by a fetch bot 510 to identify the outgoing links that the fetched document contains. Content manager 530 may add addresses associated with the outgoing links to a list of addresses that it maintains. Content manager 530 may provide addresses from the list to fetch bots 510 as instructions for fetch bots 510 to fetch (i.e., crawl) the corresponding documents. Content manager 530 may also store information associated with the fetched documents (e.g., all or part of the fetched documents, features associated with the fetched documents, etc.) in database 440 (FIG. 4).

Exemplary Model Generator Engine Functional Components

Figure 6:
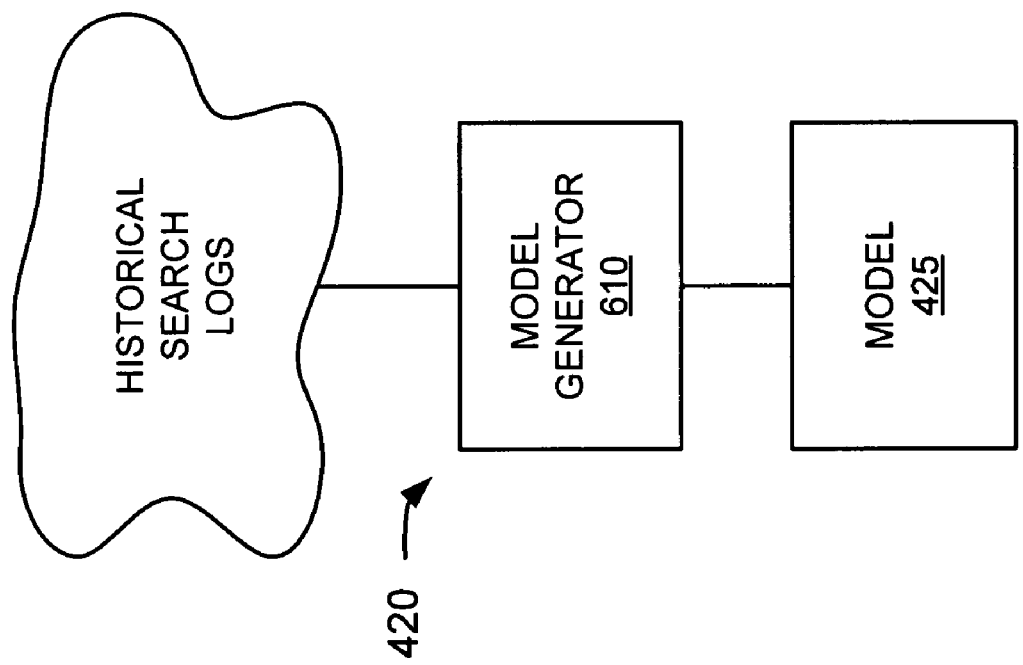
FIG. 6 is a diagram of exemplary functional components of the model generator engine of FIG. 4.

FIG. 6 is a diagram of exemplary functional components of model generator engine 420. In one implementation, model generator engine 420 may be implemented by software and/or hardware within crawler/indexer system 220. In another implementation, model generator engine 420 may be implemented by software and/or hardware within another device or a group of devices separate from or including crawler/indexer system 220.

Figure 7:
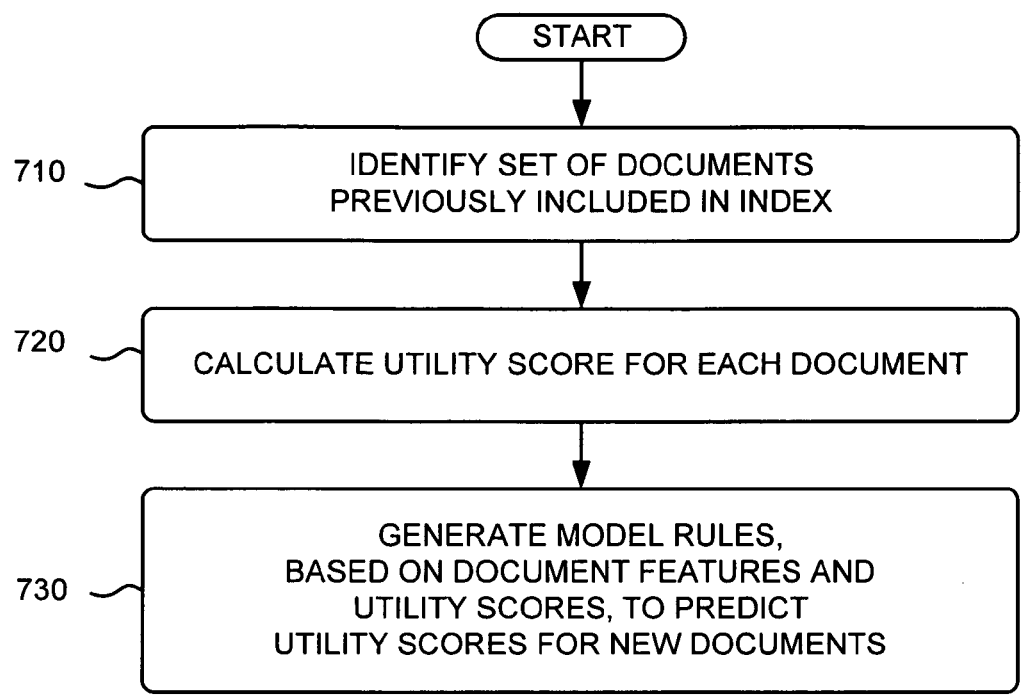
FIG. 7 is a flowchart illustrating an exemplary process for generating a model.

Model generator engine 420 may include a model generator 610 that may generate model 425 based on historical search logs. FIG. 7 is a flowchart illustrating an exemplary process for generating model 425. In one implementation, the exemplary process of FIG. 7 may be performed by model generator engine 420. In another implementation, the exemplary process of FIG. 7 may be performed by one or more other components, possibly in conjunction with model generator engine 420.

As shown in FIG. 7, the process may begin with identification of a set of documents that were previously included in the index (block 710). As described above, database 440 may store information regarding which documents were previously included in the index. In one implementation, this information may identify only those documents that were included in the index when the index was created or last updated. In an alternative implementation, the information may identify documents that were included in the index during each of multiple prior instances in time. Model generator engine 420 may identify all or a subset of the documents that were previously included in the index.

A utility score may be calculated for each of the documents in the set (block 720). The utility score for a document may be defined as a function of a measure of quality of the document as a search result for users' search queries, where high quality documents satisfy users' search queries more often than low quality documents. The specifics of this function may vary, but should consistently treat documents. For example, the utility scores for high quality documents should consistently be higher than the utility scores for low quality documents.

In one implementation, the function used to determine the utility score for a document may be based on the probability that the document will be selected (e.g., clicked on by a user) (i.e., "selection data") at least once per day when presented as a search result. In another implementation, the function may be based on the probability that the document will be presented as a search result (i.e., "impression data") at least once per day. In yet another implementation, the function may be based on the probability that the document will be selected ("selection data") or presented ("impression data") as a search result at least once during each time period, where the time period is shorter or longer than a day.

In a further implementation, the function may be based on the probability that the document will be selected ("selection data") or presented ("impression data") as a search result more than a threshold number of times (where the threshold is greater than one) during a period of time shorter than, equal to, or longer than a day. In another implementation, the function may be based on another measure of how good a result the document is to users' search queries, such as survey information (e.g., asking users to rate documents as to particular topics), vote buttons (e.g., users' selection of a rating button on a web browser toolbar that indicates whether the users like or dislike the documents), the total number of times a document satisfies a search query, and/or the total number of users for which the document satisfies a search query. In yet another implementation, the function may be based on other factors or a combination of factors.

For the implementations described hereinafter, the function used to determine the utility score will be described in terms of the probability that the document will be selected at least once per day when presented as a search result. It should be understood, however, that one or more of the other factors described above could be used.

Model generator engine 420 may determine the number of selections that each of the identified documents received when the identified documents were included in the index. In one implementation, model generator engine 420 may obtain the actual number of selections, which may be stored in the historical search logs. In another implementation, model generator engine 420 may estimate the number of selections. For example, instead of using the actual number of selections (which might not be complete because the information might not always be available), the number of selections may be estimated based on the positions of the identified documents in ranked lists of search results, which may be available in the historical search logs. For example, a relationship may exist between a document's position in a ranked list of search results and the number of selections that that document typically receives. A document in a first (top-most) position in a ranked list of search results typically may be selected 40% of the time; a document in a second (next-to-top-most) position in the ranked list typically may be selected 20% of the time; and so on. This information may be used to estimate the number of selections that the identified documents received.

Model generator engine 420 may generate the utility score for each of the identified documents based on the number of selections that the identified document received when the identified document was included in the index. For example, the number of selections that an identified document received may be used to generate a probability that the identified document would be presented as a search result and selected if the identified document is included in the index. The utility score for the identified document may be equal to, or derived from, the probability value.

Model rules, based on document features and utility scores, may be generated to predict utility scores for new documents (block 730). The utility scores and document features associated with the identified documents may be used as training data for a statistical model (e.g., model 425) whose input may include features associated with a new document and whose output may include a prediction of a utility score for the new document. In one implementation, model generator engine 420 may use a logistic regression technique to generate model 425. In another implementation, model generator engine 420 may use another technique that can map an input to an output, such as a random forest technique or a neural network.

Exemplary document features that may be used as inputs to model 425 may include the language of the document; the encoding type associated with the document; the file type associated with the document; the host, domain, top-level domain, or organization associated with the document; a link-based score associated with the document; a length, compressed length, or a ratio of the compressed length to the original size of the document; and/or if the document was previously included in the index, the document's previous utility score. In other implementations, additional, different, or combinations of document features may be used as inputs, such as other features derived from the actual document contents and/or statistics associated with host(s) or domain(s) associated with the documents.

Model generator engine 420 may test model 425 using another set of documents previously included in the index (i.e., a set of documents different from the set of documents used for the training data). For example, model generator engine 420 may determine utility scores for these documents based on the information in the historical search logs. Model generator engine 420 may then input document features associated with these documents into model 425 to obtain predicted utility scores for the documents. Model generator engine 420 may analyze the performance of model 425 based on a comparison of the utility scores and the predicted utility scores.

Exemplary Indexing Engine Functional Components

Figure 8:
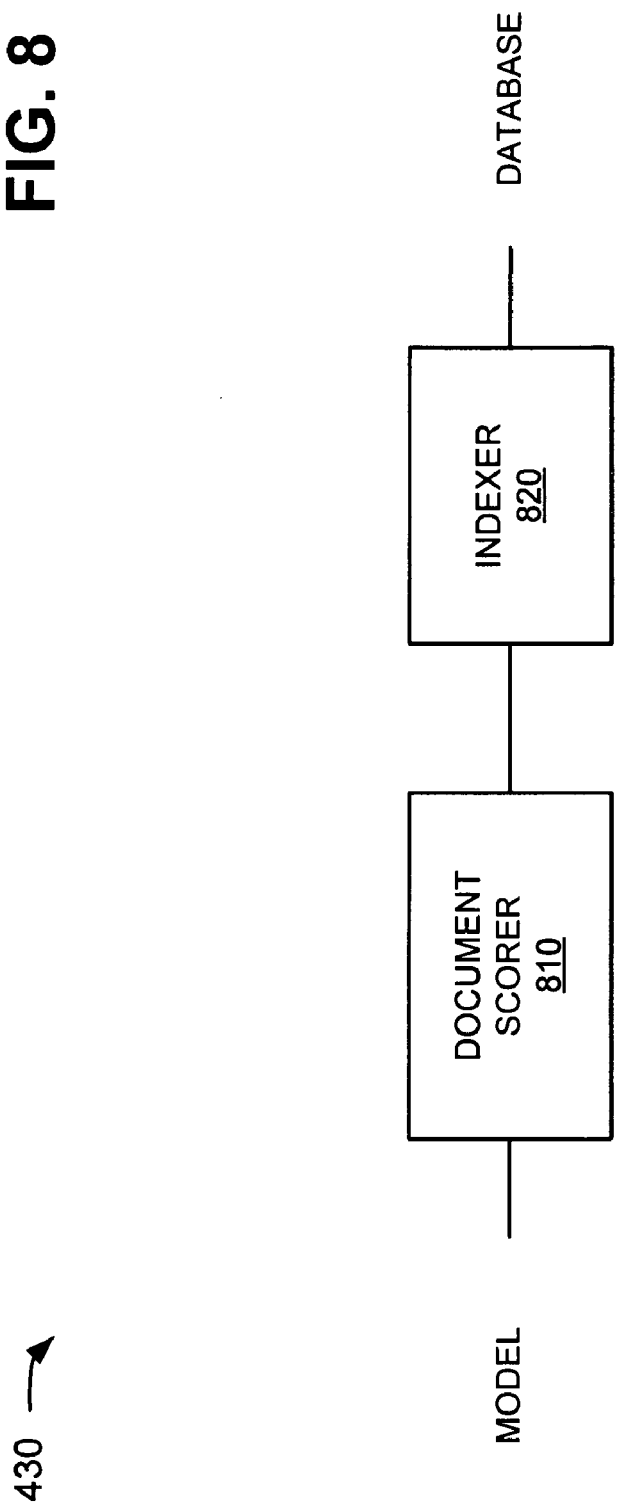
FIG. 8 is a diagram of exemplary functional components of the indexing engine of FIG. 4.

FIG. 8 is a diagram of exemplary functional components of indexing engine 430. In one implementation, indexing engine 430 may be implemented by software and/or hardware within crawler/indexer system 220. In another implementation, indexing engine 430 may be implemented by software and/or hardware within another device or a group of devices separate from or including crawler/indexer system 220.

Indexing engine 430 may include document scorer 810 and indexer 820. Document scorer 810 may determine utility scores for a collection of documents being considered for inclusion in the index. Document scorer 810 may rank the documents based on the documents' utility scores and select a number of the top-ranked documents for inclusion in the index. Indexer 820 may create the index based on the selected documents.

Figure 9:
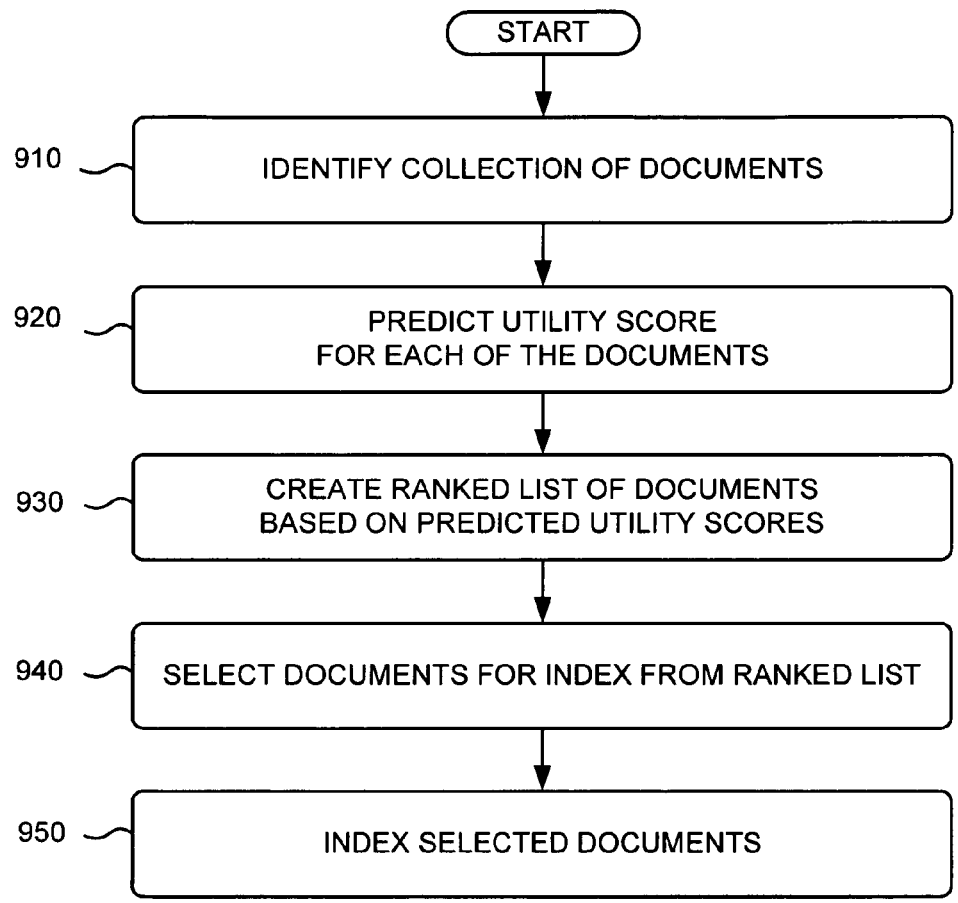
FIG. 9 is a flowchart illustrating an exemplary process for selecting documents for an index.

FIG. 9 is a flowchart illustrating an exemplary process for selecting documents for an index. In one implementation, the exemplary process of FIG. 9 may be performed by indexing engine 430. In another implementation, the exemplary process of FIG. 9 may be performed by one or more other components, possibly in conjunction with indexing engine 430.

As shown in FIG. 9, the process may begin with a collection of documents being identified (block 910). For example, indexing engine 430 may identify documents that were previously identified by crawler engine 410. Indexing engine 430 may consider these documents for the index. Indexing engine 430 may periodically create, or recreate, the index. Any of the documents previously included in the index may be candidates to remain in or to be removed from the index. Any of the documents previously not included in the index may be candidates to be included in the index.

A utility score may be predicted for each of the documents (block 920). For example, indexing engine 430 may determine document features for each of the documents. In one implementation, indexing engine 430 may obtain the document features from database 440. Indexing engine 430 may input the document features, for each of the documents, into model 425 to obtain a predicted utility score for the document.

A ranked list of documents may be created based on the predicted utility scores (block 930). Indexing engine 430 may use one or more techniques to rank the documents for the ranked list. In one implementation, indexing engine 430 may rank the documents solely based on the documents' utility scores. Thus, documents with higher predicted probabilities of being selected when presented as search results may appear higher in the ranked list than documents with lower predicted probabilities of being selected when presented as search results.

In another implementation, indexing engine 430 may consider the documents' cost of being included in the index when ranking the documents. In one implementation, a document's cost may be a function of the amount of space required to index the document. For example, a document takes up a certain amount of space in the index based on the number of words and other ancillary data associated with the document. The size of the index is limited. Therefore, the number of documents that can be included in the index is a function of the amount of space required to index the documents. In this case, a final utility score ($U_F$) for a document may be a function of the document's predicted utility score and the document's cost. Indexing engine 430 may rank the documents based on the documents' final utility scores.

In yet another implementation, indexing engine 430 may consider how the documents previously performed in the index when ranking the documents. For example, the historical search logs may record performance information regarding the number of selections of the documents when these documents were previously included in the index. A performance score may be generated based on the number of selections of the documents for only the last time that the documents were included in the index, or for multiple times that the documents were previously included in the index. For longer time periods, the performance score may reflect a pattern of performance for the documents. The performance score may be used to adjust the utility scores of the documents. In this case, a final utility score ($U_F$) for a document may be a function of the document's predicted utility score and the document's performance score. Indexing engine 430 may rank the documents based on the documents' final utility scores.

In a further implementation, indexing engine 430 may consider the contents of the documents when ranking the documents. For example, the words and phrases included in a document may be considered when determining whether to select the document for the index. A content score may be generated for each of the documents based on whether the document's content contains words that relate to a hot topic, a topic frequently sought by users, a topic not frequently sought by users, or a rare topic covered by few documents. For example, it might be beneficial to include a document relating to a hot topic, a topic frequently sought by users, and/or a rare topic in the index, but not a document relating to a topic not frequently sought by users. In this case, a final utility score ($U_F$) for a document may be a function of the document's predicted utility score and the document's content score. Indexing engine 430 may rank the documents based on the documents' final utility scores.

In another implementation, indexing engine 430 may consider the freshness of the documents when ranking the documents. For example, it may be determined whether a crawled document being considered for the index matches in content the corresponding "live" document currently available on the network. A match score may be generated that indicates whether the crawled document matches the live document. The match score may penalize a crawled document that does not match the corresponding live document. In this case, a final utility score ($U_F$) for a document may be a function of the document's predicted utility score and the document's match score. Indexing engine 430 may rank the documents based on the documents' final utility scores.

In yet another implementation, indexing engine 430 may consider a measure of the importance of the documents when ranking the documents. For example, an importance score may be determined for a document based on, for example, the document's link-based score. Several techniques exist for determining a document's link-based score, such as the PageRank® algorithm. In this case, a final utility score ($U_F$) for a document may be a function of the document's predicted utility score and the document's importance score. Indexing engine 430 may rank the documents based on the documents' final utility scores.

In a further implementation, indexing engine 430 may consider a combination of the above-identified factors when ranking the documents. Alternatively, indexing engine 430 may consider one or more of the above-identified factors alone (i.e., without using the utility scores) when ranking the documents.

Documents for the index may be selected from the ranked list (block 940). For example, indexing engine 430 may select a number of the top-ranked documents in the ranked list for inclusion in the index. In one implementation, certain documents may be removed from the ranked list prior to selecting a number of the top-ranked documents. For example, indexing engine 430 may remove documents that have been identified as spam from the ranked list. Several techniques exist for identifying a document as spam, such as by analyzing the links to/from the document, analyzing the host or domain with which the document is associated, etc.

Alternatively, or additionally, indexing engine 430 may remove documents associated with web sites on a blacklist from the ranked list. For example, web sites might be inspected (automatically or manually) to determine whether these web sites should definitely not be included in the index. Potentially malicious web sites, such as link farms, page or site hijackers, web sites using keyword stuffing, hidden or invisible unrelated text, or meta tag stuffing, etc., may be placed on a blacklist, which means that the documents associated with these web sites should definitely not be included in the index.

Alternatively, or additionally, indexing engine 430 may remove documents that are duplicates of documents already included in the ranked list. Indexing duplicate documents may waste space in the index that could be used to index a potentially useful document.

In another implementation, indexing engine 430 may automatically select certain documents for inclusion in the index regardless of the documents' positions within the ranked list. Due to the limited size of the index, the automatic selection of these documents may cause the number of the top-ranked documents selected from the ranked list to be reduced.

For example, indexing engine 430 may compare the documents in the ranked list to a whitelist. Web sites might be inspected (automatically or manually) to determine whether these web sites should definitely be included in the index. Important web sites, such as Amazon.com, Google.com, CNET.com, ESPN.com, and other very popular web sites, may be placed on a whitelist, which means that the documents associated with these web sites should definitely be included in the index. Indexing engine 430 may identify documents associated with the web sites in the whitelist and automatically select the identified documents for inclusion in the index, regardless of the documents' position within the ranked list.

Additionally, or alternatively, indexing engine 430 may operate under a set of quotas. Quotas may be necessary to avoid self-fulfilling prophecies. For example, a search engine may currently receive few search queries for documents in a particular language. As a result, these documents may have low utility scores and, therefore, may not be selected for the index. When users try searching for documents in that particular language, they may find very few results. Thus, they may abandon the search engine, leading to even fewer searches for documents in the particular language. A language quota may solve this problem by ensuring that at least a minimum number of documents in that language are selected for inclusion in the index. This may improve the quality of searches for documents in that language and, thus, the users' search experience.

Quotas may be used for any of a number of reasons. For example, a quota may be set for a particular language to ensure that at least a minimum number of documents in that language are present in the index. Additionally, or alternatively, a quota may be set for particular geographic regions. For example, English-language documents may originate from different regions of the world but the documents in these different regions may be associated with quite different topics. Additionally, or alternatively, a quota may be set at a host or domain level to ensure that at least a minimum number of documents from that host or domain are present in the index. Additionally, or alternatively, a quota may be set for a number of low utility scoring documents. It may be beneficial to intentionally include some low utility scoring documents in the index to assist in training model 425. One reason to include these low utility scoring documents in the index is that if they are not included, it may be forgotten the next time that model 425 is trained that these documents were poor performers. Another reason is that if the index only includes good performing documents, then model 425 may begin to believe that all documents are good performing documents. A further reason is that if model 425 determines that a certain class of documents are poor performers, then model 425 may develop a blind spot for them—meaning that if these documents later turn into good performers, model 425 may not recognize them as such and, thus, these documents may continue to be excluded from the index.

The selected documents may be indexed (block 950). For example, indexing engine 430 may take the text or other data of the selected documents, extract individual terms or other data from the text of the selected documents, and sort those terms or other data (e.g., alphabetically) in an index. Other techniques for extracting and indexing content, that are more complex than simple word-level indexing, may also or alternatively be used, including techniques for indexing XML data, images, videos, etc. Each entry in the index may contain a term or other data stored in association with a list of documents in which the term or other data appears and the location within the document(s) where the term or other data appears. The index may be stored in a memory, such as database 440.

In one implementation, as mentioned above, the index may include multiple index tiers. The processes described herein may be applied across index tiers or may be applied separately to individual index tiers. Further, information regarding which index tier in which a document was placed may be maintained (e.g., in database 440) and used in subsequent rankings of the documents.

CONCLUSION

Implementations described herein may provide techniques for selecting documents for an index. These techniques may be useful in several respects: to remove documents from the index, to determine which document to newly place in the index, and/or to remember which documents were good performers and poor performers over time.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7 and 9, the order of the blocks may be modified in other implementations. Further, non-dependent blocks may be performed in parallel.

Also, while it has been described that a model is generated to predict documents' utility scores, this need not be the case. In another implementation, actual utility scores (determined from the historical search logs) may be used instead of predicted utility scores.

It may also be beneficial to customize an index to a particular region of the world. For example, an index may be created specifically for users in Europe. In this case, search logs relating to European traffic may be used to select documents for the index.

As used herein, the term "component," is intended to be broadly interpreted to refer to hardware, software, or a combination of hardware and software.

While it has been described that the utility scores for high quality documents should be consistently higher than the utility scores for low quality documents, this need not be the case. In another implementation, the utility scores for high quality documents can be consistently lower than the utility scores for low quality documents. The techniques described herein may be modified accordingly.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An automated method, comprising:
    identifying, by one or more processors associated with one or more computer devices, a collection of documents;
    predicting, by one or more processors associated with one or more computer devices, a utility score for each document of a plurality of documents in the collection of documents, the utility score reflecting a measure of quality of the document as a search result for search queries, the utility score for a particular document, in the plurality of documents, being predicted based on:
    rules generated of a model based on a plurality of search queries and corresponding search results, and
    at least one of:
        a probability that the particular document will be selected at least a threshold number of times during a particular time period when the particular document is presented as a search result, or a probability that the particular document will be presented as a search result at least a threshold number of times during a particular time period;

creating, by one or more processors associated with one or more computer devices, a ranked list of the plurality of documents based on the predicted utility scores for the plurality of documents;

selecting, by one or more processors associated with one or more computer devices, a number of the documents in the ranked list of the plurality of documents;

indexing, by one or more processors associated with one or more computer devices, the selected documents to create an index; and storing, in a memory, the index.

2. The method of claim 1, further comprising:
training the model based on:
   historical search logs that contain information regarding a plurality of search queries submitted by a plurality of users prior to training the model, and
   the information regarding the search results that were provided to the users,
where predicting the utility score for the particular document in the plurality of documents further includes:
   determining document features associated with the particular document, and
   using the document features as inputs into the model.

3. The method of claim 1, where predicting the utility score for the particular document includes:
predicting how users would rate the particular document.

4. The method of claim 1, where creating the ranked list of the plurality of documents includes:
determining a cost of indexing each of the plurality of documents, and
ranking the plurality of documents based on the predicted utility scores and the determined costs of indexing.

5. The method of claim 1, where creating the ranked list of the plurality of documents includes:
determining a performance score for each of the plurality of documents based on a number of selections that the document received when the document was included in the index prior to determining the performance score for each of the documents, and
ranking the plurality of documents based on the predicted utility scores and the performance scores.

6. The method of claim 1, where creating the ranked list of the plurality of documents includes:
determining a content score for each of the plurality of documents based on whether words in the document relate to particular topics, and
ranking the plurality of documents based on the predicted utility scores and the content scores.

7. The method of claim 1, where creating the ranked list of the plurality of documents includes:
determining a match score for each of the plurality of documents based on whether the document matches a document that is currently available to users, and
ranking the plurality of documents based on the predicted utility scores and the match scores.

8. The method of claim 1, where creating the ranked list of the plurality of documents includes:
determining an importance score for each of the plurality of documents, and
ranking the plurality of documents based on the predicted utility scores and the importance scores.

9. The method of claim 1, where selecting the number of the documents in the ranked list of the plurality of documents includes:
removing one or more of the plurality of documents from the ranked list of the plurality of documents, and
selecting the number of the documents in the ranked list of the plurality of documents after removing the one or more documents from the ranked list of the plurality of documents.

10. The method of claim 1, where selecting the number of the documents in the ranked list of the plurality of documents includes:
identifying documents associated with particular web sites,
selecting the documents associated with the particular web sites, and
selecting the number of the documents in the ranked list of the plurality of documents based on the selected documents associated with the particular web sites.

11. The method of claim 1, where selecting the number of the documents in the ranked list of the plurality of documents includes:
identifying a quota,
selecting a group of documents, in the ranked list of the plurality of documents, based on the quota, and
selecting the number of the documents in the ranked list of the plurality of documents based on the group of documents selected based on the quota.

12. The method of claim 11, where selecting the group of documents based on the quota includes:
selecting a set of documents associated with a particular language,
selecting a set of documents associated with a particular geographic region,
selecting a set of documents associated with a particular host or domain, or
selecting a set of documents with the predicted utility scores that are lower than the predicted utility scores associated with documents of the number of documents.

13. A system comprising:
one or more computer devices, including one or more processors, to:
   identify a collection of documents;
   predict a measure of quality of each document, of a plurality of documents in the collection of documents, as a search result for search queries,
   the measure of quality of a particular document, in the plurality of documents, being predicted based on:
      rules generated of a model based on a plurality of search queries and corresponding search results, and
      at least one of:
         a probability that the particular document will be selected at least a threshold number of times during a particular time period when the particular document is presented as a search result, or
         a probability that the particular document will be presented as a search result at least a threshold number of times during a particular time period
   create a ranked list of the plurality of documents based on the predicted measures of quality of the documents;
   select a number of the documents in the ranked list of the plurality of documents;
   index the selected documents to create an index; and
   store the index.

14. The system of claim 13, where when creating the ranked list of the plurality of documents, the one or more computer devices are further to:
  determine a match score for each of the plurality of documents based on whether the document matches a document that is available to users, and
  rank the plurality of documents based on the predicted measures of quality and the match scores.

15. The system of claim 13, where when selecting the number of the documents in the ranked list of the plurality of documents, the one or more computer devices are further to:
  identify documents associated with particular web sites,
  select the documents associated with the particular web sites, and
  select the number of the documents in the ranked list of the plurality of documents based on the selected documents associated with the particular web sites.

16. The system of claim 13, where when selecting the number of the documents in the ranked list of the plurality of documents, the one or more computer devices are further to:
  select one or more documents, of the number of the documents in the ranked list of the plurality of documents, based on a quota,
  where the quota is based on:
    a particular language associated with the one or more documents, or
    the one or more measures of quality of the one or more documents.

17. A system implemented within one or more computer devices, the system comprising:
  one or more memories; and
  one or more processors, connected to the one or more memories, to:
    identify a collection of documents,
    predict a measure of quality of each document, of a plurality of documents in the collection of documents, as a search result for search queries,
    the measure of quality of a particular document, in the plurality of documents, being predicted based on:
      rules generated of a model based on a plurality of search queries and corresponding search results, and
      at least one of:
        a probability that the particular document will be selected at least a threshold number of times during a particular time period when the particular document is presented as a search result, or
        a probability that the particular document will be presented as a search result at least a threshold number of times during a particular time period,
    create a ranked list of the plurality of documents based on the predicted measures of quality for the documents,
    select a number of the documents in the ranked list of the plurality of documents,
    index the selected documents to create an index, and
    store the index in the one or more memories.

18. The system of claim 17, where when predicting the measure of quality of the particular document, the one or more processors are to:
  determine document features associated with the particular document, and
  use the document features as inputs into the model, the model outputting the predicted measure of quality of the particular document as a search result for one or more user search queries.

19. The system of claim 18, where the one or more processors are further to:
  train the model based on:
    historical search logs that include information regarding a plurality of search queries submitted by a plurality of users, and
    search results that were provided to the users.

20. The system of claim 17, where when creating the ranked list of the plurality of documents, the one or more processors are to:
  rank the plurality of documents solely based on the predicted measures of quality of the plurality of documents.

21. The system of claim 17, where when creating the ranked list of the plurality of documents, the one or more processors are to:
  determine a cost of indexing each of the plurality of documents, and
  rank the plurality of documents based on the predicted measures of quality and the determined costs of indexing.

22. The system of claim 17, where when creating the ranked list of the plurality of documents, the one or more processors are to:
  determine a performance score for each of the plurality of documents based on a number of selections that the document received when the document was included in the index, and
  rank the plurality of documents based on the predicted measures of quality and the performance scores.

23. The system of claim 17, where when creating the ranked list of the plurality of documents, the one or more processors are to:
  determine a content score for each of the plurality of documents based on whether words in the document relate to particular topics, and
  rank the plurality of documents based on the predicted measures of quality and the content scores.

24. The system of claim 17, where when creating the ranked list of the plurality of documents, the one or more processors are to:
  determine an importance score for each of the plurality of documents, and
  rank the plurality of documents based on the predicted measures of quality and the importance scores.

25. The system of claim 17, where when selecting the number of the documents in the ranked list of the plurality of documents, the one or more processors are to:
  remove one or more of the documents from the ranked list of the plurality of documents, and
  select the number of the documents in the ranked list of the plurality of documents after removing the one or more documents from the ranked list of the plurality of documents.

26. The system of claim 17, where when selecting the number of the documents in the ranked list of the plurality of documents, the one or more processors are to:
  identify a quota,
  select a group of documents based on the quota, and
  select the number of the documents in the ranked list of the plurality of documents based on the group of documents selected based on the quota,
  where the selected number of the documents, in the ranked list of the plurality of documents, include the documents selected based on the quota.

27. The system of claim 26, where when selecting the group of documents based on the quota, the one or more processors are to:

select a set of documents associated with a particular language, where the quota is based on the particular language, select a set of documents associated with a particular geographic region, where the quota is based on the particular geographic region, select a set of documents associated with a particular host or domain, where the quota is based on the particular host or domain, or select a set of documents with the predicted measures of quality that are lower than the predicted measures of quality associated with documents of the number of documents, where the quota is based on the predicted measures of quality that are lower than the predicted measures of quality associated with the documents of the number of documents.

28. An automated method, comprising:

identifying, by one or more processors associated with one or more computer devices, a set of documents that have been included in an index;

determining, by one or more processors associated with one or more computer devices and for each document of a plurality of documents in the set of documents, predict a utility score that reflects a measure of quality of the document as a search result for search queries, the utility score, for a particular document in the plurality of documents, being determined based on at least one of:

a probability that the particular document will be selected at least a threshold number of times during a particular time period when the particular document is presented as a search result, or a probability that the particular document will be presented as a search result at least a threshold number of times during a particular time period;

determining, by one or more processors associated with one or more computer devices, a set of document features associated with each document of the plurality of documents;

generating, by one or more processors associated with one or more computer devices, based on the sets of document features and the utility scores, model rules of a model that maps the sets of document features to the utility scores; and storing, in a memory, the model.

29. The method of claim 28, further comprising:

identifying a group of additional documents;

determining document features for each of the additional documents;

using the document features as inputs into the model to predict utility scores for the additional documents; and determining whether to include the additional documents in the index based on the utility scores predicted for the additional documents.

30. The method of claim 28, further comprising:

creating a ranked list of the plurality of documents based solely on the determined utility scores for the plurality of documents.

* * * * *